Apr. 3, 1923.

R. W. SCHROEDER

FLOWMETER

Filed Oct. 30, 1919

Rudolph William Schroeder
Inventor

Apr. 3, 1923.

R. W. SCHROEDER 1,450,611

FLOWMETER

Filed Oct. 30, 1919

Rudolph William Schroeder
Inventor

Patented Apr. 3, 1923.

1,450,611

UNITED STATES PATENT OFFICE.

RUDOLPH WILLIAM SCHROEDER, OF DAYTON, OHIO.

FLOWMETER.

Application filed October 30, 1919. Serial No. 334,465.

*To all whom it may concern:*

Be it known that I, RUDOLPH W. SCHROEDER, a citizen of the United States, residing at Dayton, in the county of Montgomery and State of Ohio, have invented certain new and useful Improvements in Flowmeters, of which the following is a specification.

This invention relates to an improvement in flow meters and has particular reference to an instrument for measuring the rate of flow of a fluid.

Objects of the invention are to provide means whereby the rate of flow of a fluid is instantly obtained and to avoid false readings which are caused by various defects to be found in other types of flow meters.

A particular object of the invention is to provide an instrument which measures the rate of flow of gasolene to the internal combustion engine of an airplane and enables the pilot thereof to ascertain the most economical cruising speed of his motor.

It is to be observed that the importance of economy in fuel in an airplane cannot be overestimated, and a device that will instantly register the most economical cruising speed under all conditions of altitude and temperature is absolutely essential. Some instruments heretofore invented for this purpose have been complicated by the employment of springs or other devices which are subject to errors due to fatigue and break, and likewise subject to errors due to age, and temperature fluctuations on the springs.

Now, in my device which is to be composed in the main of two or more compartments, one a gauge glass compartment and the other a stand pipe compartment, filled with the fluid to be measured, it will be noticed that these compartments are connected by a slot so that as the rate of flow increases the movable member in the first compartment allows a greater part of the slot to be opened. It will be observed that to the movable member is attached an indicator which is used in conjunction with a graduated scale or a calibrated dial which will register the rate of flow of the fluid. In my improved flow meter the use of all balancing springs is avoided for the movable member in my device, and by the construction of the compartment the fluid is allowed to be on both sides of the movable member, and thus it is assured that there will be no false readings due to leaks around this member, as would be the case if the inlet were on one side of the movable member and the outlet on the other.

It will be further noted in my invention that the movable member rests on the peak of the disturbance caused by the rush of fluid at the inlet, as will be further described below.

This device, while primarily intended for a gasolene flow meter, may be utilized for indicating the rate of flow of any liquid or gas and I do not intend to restrict its application to a gasolene flow meter, but to claim it for measuring the rate of flow of all fluids.

Other and further objects will appear as the nature of the invention is better understood from consideration of the following description taken in conjunction with the attached drawings, wherein like numerals designate like members throughout the several views, and in which:—

Figure 1:
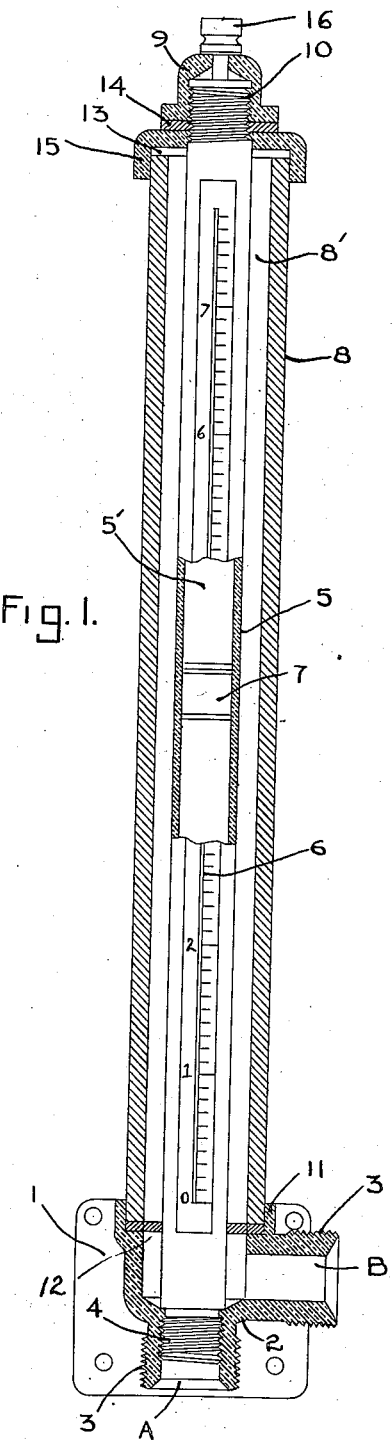
Fig. 1 is a side elevation, partly in section, of my device.
Figure 2:
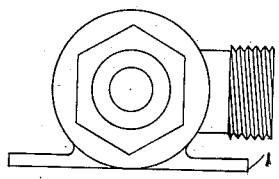
Fig. 2 is a plan view of the device.
Figure 3:
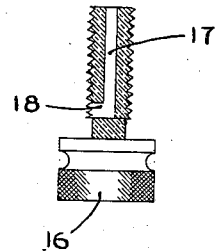
Fig. 3 is a view in detail showing the thumb-screw partly in section.
Figure 4:
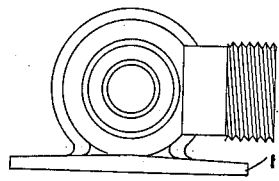
Fig. 4 is another plan view of the device.

In the construction of a flow meter in accordance with my invention I have provided, as shown in Fig. 1, a plate or frame 1 equipped with an L-shaped fitting 2 having exterior screw-threaded portions 3 for pipe connections and an internal screwthreaded portion 4 for the reception of a standpipe 5, slotted as shown at 6. The L-shaped pipe is provided with an inlet A and an outlet B. Within a stand pipe compartment 5' there is provided a movable member or indicator 7 for a purpose to be hereinafter described, while surrounding the stand pipe 5 is a gauge glass 8 and a gauge glass compartment 8', which gauge glass is held in position by a nut 9 which screws onto the stand pipe 5 at threaded portions 10 and compresses the gauge glass against shoulders 11 of the L-shaped fitting 2. Washers 12, 13 and 14 are provided to make the device fluid-tight, while the cap 15 embraces one end of the gauge glass 8. The thumbscrew 16 is provided with a longitudinal passage-way 17 and a lateral outlet 18 which connect and function as an air vent. It will be noted that on unscrewing thumb-screw 16 an escape of air will be permitted until the device has been filled with the fluid to be measured. The thumb-screw is then screwed on again until the lateral opening is covered by a nut 9.

Figure 5:
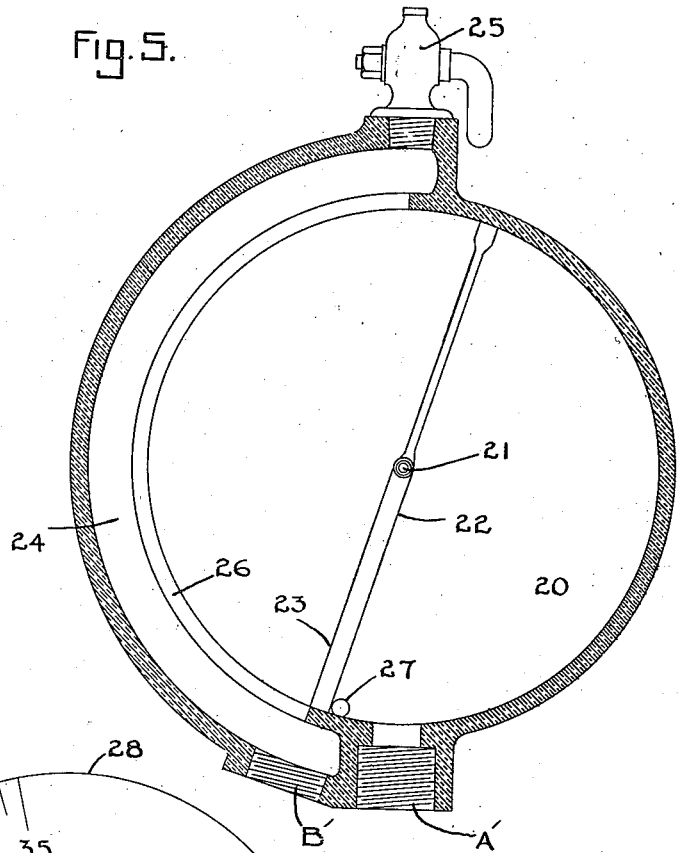
Fig. 5 is a modification of the device shown partly in section.

In the form of device shown in Fig. 5, the inlet port A' is provided to permit the passage of fluid to the compartment 20 which corresponds to the stand pipe compartment 5', as shown in Fig. 1. Upon the pivot point 21 is mounted a movable member 22, which is slightly heavier at the lower end 23 so that by force of gravity it will assume its normal position when no fluid is passing through the inlet port. Corresponding to the gauge glass compartment B' as shown in Fig. 1, there is provided a second compartment 24 terminating at its lower end in the outlet port B' and at its upper end in a pet cock 25 which functions the same as thumb-screw 16 which is shown to advantage in Fig. 1. It will be observed that there is also provided a slot 26 which permits the passage of the fluid from the compartment 20 to the compartment 24 and then through the outlet B', while a stop 27 is disposed adjacent the inlet for the purpose of limiting the downward swing of the movable member 22.

Figure 6:
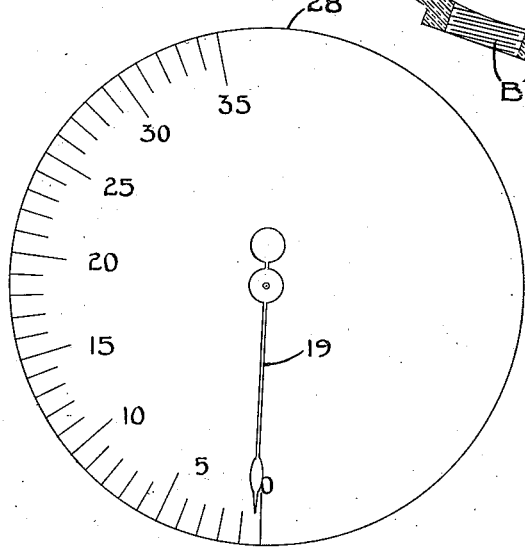
Fig. 6 is a side elevation of the calibrated dial which is mounted on the device shown in Fig. 5.

In Fig. 6 there is shown a calibrated dial 28 which is suitably attached to the instrument through the medium of a pivot point 21. It will be noted that as the movable member turns on the pivot actuated by the passage of inrushing fluid through the inlet port A', the indicator 19 will move with the movable member and will register upon the calibrated dial the rate of flow of the fluid used.

The operation of the device is as follows: The fluid being turned on from the supply tank enters the inlet A and fills up the stand pipe compartment 5', forcing the movable member 7 upward, while a limited amount of the fluid escapes through the slot. The thumb-screw 16 is turned to allow air to escape, and the inrush of fluid will fill the stand pipe compartment 5'. After this operation the thumb-screw 16 is then tightened down and the device is ready for use, for no air is present in the compartment to interfere with the working of the instrument. As the flow increases, the movable member is forced up by the inrushing fluid and thus uncovers more of the slot and accordingly allows more of the fluid to pass into the gauge glass compartment and thence through the outlet. The height to which the movable member rises in the stand pipe thus indicates the quantity of fluid passing at that instant. The movable member rides on the peak of the inrushing wave or stream of fluid in a manner not unlike the ball on the jet from the fountain except in so far as there is fluid all about the movable member it is not subject to undue vibration.

In tests that have been made it has been found that the slightest changes of flow are instantly denoted, but that if no changes of flow were made the movable member remained very steady, for the height to which the stream of water from a fountain would maintain a ball in a ball and jet device would be the indicator of the rate of flow of water from the pipe.

From the foregoing description it will be observed that I have provided a flow meter that does not depend on the movement of the fluid past the movable member. There is fluid above the movable member as well as below the same, so that there will be no error caused by leakage past the movable member. The movable member's action is governed solely by the magnitude of the disturbance of wave caused by the inrush of fluid.

While the accompanying drawings illustrate the approved embodiment of my invention, I do not wish to be confined thereto, as various forms, modifications and arrangements of the parts as shown may be had without departing from the spirit or scope of the invention as claimed.

Having now fully described my invention, what I claim is:

1. A device for indicating the rate of flow of a fluid comprising a gauge glass compartment having an outlet for the fluid, a pipe in said compartment having a longitudinal slot in the wall thereof communicating with said compartment and an inlet and a piston in the tube moved by the fluid along the slot controlling the communication between the pipe and gauge glass compartment.

2. A device for indicating the rate of flow of a fluid comprising a gauge glass compartment having an outlet, a stand pipe therein, having a longitudinal slot by means of which the interior of the stand pipe communicates with said compartment and an inlet and a movable indicating member moved by the fluid along the slot by the flow of liquid through the device.

3. A device for indicating the rate of flow of a fluid comprising, a gauge glass compartment having an outlet for the fluid, a stand pipe in said first mentioned compartment and having an inlet and a slot therein, a set screw having a longitudinal passage-way and a lateral outlet for controlling the amount of air in said stand pipe compartment, and a movable member in the path of the fluid and actuated by the trend of the latter.

4. A device for indicating the rate of flow of a fluid including, a graduated pipe having inlet and outlet openings and provided with a longitudinal slot therein, means for controlling the amount of air in said graduated pipe, means for making the upper portion of said pipe air-tight, and a movable member in the path of the fluid and moved along the slot by the flow of the fluid.

5. In a device for indicating the rate of flow of a fluid including, a graduated pipe having inlet and outlet openings and provided with a longitudinal slot therein, a vented thumb screw for controlling the amount of air in said graduated pipe, a washer for making the upper portion of said pipe air-tight, and a movable member in the path of the fluid and moved by the flow of the fluid along the slot.

6. A device for indicating the rate of flow of a fluid including, a stand pipe compartment having inlet and outlet openings and provided with a longitudinal slot therein, means for controlling the amount of air in said device, a movable member in the path of the fluid and actuated by the trend of the latter to cover and uncover the slot of said stand pipe compartment, and a stop for limiting the movement of said movable member.

7. In a device of the class described, a housing having parallel chambers therein, a longitudinal slot in the wall separating said chambers, one of said chambers having a fluid inlet at one end and being closed at the other end, the other of said chambers having an outlet at one end and being closed at the other end thereof, a piston reciprocable in one of said chambers along said slot and governed as to its position by fluid flowing through the slot.

8. In a device of the class described, a housing having parallel chambers therein, the wall separating said chambers being longitudinally slotted to afford communication between said chambers, one of said chambers having an inlet and the other an outlet, said inlet and outlet being at the same end of the device and an indicating piston reciprocable in one of said chambers along said slot and governed as to its position by fluid flowing through the slot.

9. In a device of the class described, an inner and an outer tube, the former having a longitudinal slot therein, a piston movable longitudinally of the inner tube and along the slot, an inlet communicating with the inner tube, and outlet communicating directly with the space between said tubes, the inlet and outlet being at the same end of the device.

10. In a device of the class described, an inner and an outer tube, the former being formed with a longitudinal slot therein, an inlet communicating directly with the lower end of the inner tube, an outlet communicating directly with the space between the tubes at the lower ends thereof and a piston within the inner tube and movable longitudinally thereof under the influence of the fluid flowing through the device.

11. In a device of the class described, an inner and an outer tube, the former being formed with a longitudinal slot therein, an inlet communicating directly with the lower end of the inner tube, an outlet communicating directly with the space between the tubes at the lower ends thereof and a vent at the upper end of the device for exhausting air and gas therefrom.

12. A flowmeter comprising a member having a chamber therein provided with inlet and outlet openings below the upper portion of said chamber, a vent for permitting the escape of gas entrapped in the upper portion of said chamber, and means for closing said vent to render the upper portion of said chamber air-tight.

13. A flowmeter comprising an upright tubular member having inlet and outlet openings below the top thereof, a piston movable up and down in said tubular member and actuated by fluid passing through said member, and means for permitting the escape of gas from the upper portion of said member and for rendering said upper portion air-tight.

14. A flowmeter comprising an upright tubular member having inlet and outlet openings below the top thereof, a piston movable up and down in said tubular member and actuated by fluid passing through said member, and means for permitting the escape of gas from the upper portion of said member and for rendering said upper portion air-tight.

15. A flowmeter comprising a gauge glass, a tubular member having a longitudinal slot therein arranged within said gauge glass, an inlet for said tubular member at the bottom end thereof, an outlet for the lower end of said gauge glass, a piston within said tubular member and movable up and down therein under the influence of fluid passing through said tubular member, a vent for the upper portion of said gauge glass and tubular member for permitting the escape of gas entrapped in said flowmeter, and means for closing said vent to render the upper portion of said flowmeter air-tight.

In testimony whereof I have affixed my signature.

RUDOLPH WILLIAM SCHROEDER.